UNITED STATES PATENT OFFICE.

JOHN WEMER, OF NEW YORK, N. Y.

BROMIN SOLUTION.

1,183,055.   Specification of Letters Patent.   Patented May 16, 1916.

No Drawing.   Application filed July 1, 1913.   Serial No. 776,797.

*To all whom it may concern:*

Be it known that I, JOHN WEMER, a citizen of the United States, and a resident of the city, county, and State of New York, have invented certain new and useful Improvements in Bromin Solutions, of which the following is a specification.

My invention relates to chemical compositions and one of its objects is to provide a combination of chemicals having bromin therein in a chemically available and functionally active form.

Other objects and advantages of my invention will be set forth hereinafter.

Bromin has long been known to possess antiseptic, germicidal and disinfectant properties, but it has not been suitable for these purposes on account of its irritant properties and obnoxious odor. If combined with alkalis or other bases with a view to avoiding some of the aforesaid disadvantages, it is rendered ineffective.

According to my invention, I avoid all of the disadvantageous properties, while at the same time the desirable properties are maintained, by combining the bromin with a glycerid or a vegetable acid in glycerin.

The most suitable vegetable acids are those of the tannin group and gallic acid which are readily soluble in glycerin. I prefer to use tannic acid but my invention is not restricted in this regard.

One part of bromin is mixed with two and one half (2½) parts of tannin dissolved in ten (10) parts of glycerin, the mixture is placed in a closed vessel and the whole agitated until all of the bromin is combined and none remains free in the product. A perfect solution is thus obtained which is stable, has no sediment and will not precipitate. For some purposes it may be desirable to make a syrup of white rock candy in pure water about seven and one half (7½) pounds of the rock candy being dissolved in each gallon of the syrup and to mix this syrup with the bromin solution preferably in the proportions of ten (10) parts of the syrup to one part of the bromin solution.

My solution may be used for various chemical and medicinal purposes and it is well adapted to be used externally as a disinfectant and healing agent, or internally as a medicine. When mixed with the syrup, it is specially adapted to be taken internally.

While I believe the proportions designated are particularly desirable, they are not essential and my invention is not restricted to them.

What I claim is:

1. A solution of bromin with glycerite of a trihydroxybenzoic acid.
2. A solution of bromin with a glycerite of tannic acid.
3. A solution containing two and one half parts of tannin, ten parts of glycerin with one part of bromin.
4. A solution of bromin with glycerite of a substance containing a nucleus as follows:

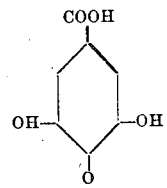

In witness whereof, I have hereunto set my hand this 30 day of June in the year 1913.

JOHN WEMER.

Witnesses:
E. V. THOMPSON,
THEO. FAGERSTROM.